United States Patent [19]
Dunfield et al.

[11] Patent Number: 5,694,268
[45] Date of Patent: Dec. 2, 1997

[54] SPINDLE MOTOR HAVING OVERMOLDED STATOR

[75] Inventors: John Charles Dunfield, Santa Cruz; Gunter Karl Heine, Aptos, both of Calif.

[73] Assignee: Seagate Technology, Inc., Scotts Valley, Calif.

[21] Appl. No.: 550,175

[22] Filed: Oct. 30, 1995

Related U.S. Application Data

[63] Continuation-in-part of Ser. No. 386,883, Feb. 10, 1995.
[51] Int. Cl.$^6$ .............................. G11B 17/02; H02K 5/24; H02K 7/14
[52] U.S. Cl. .................... 360/98.07; 360/99.08; 310/67 R; 310/51; 310/254
[58] Field of Search ............... 360/97.01, 98.01, 360/98.07, 98.08, 99.04, 99.08–99.12; 310/51, 67 R, 254

[56] References Cited

U.S. PATENT DOCUMENTS

| | | | |
|---|---|---|---|
| 1,688,891 | 10/1928 | Spreen | 310/51 |
| 3,438,407 | 4/1969 | Frohmuller et al. | 310/51 |
| 3,546,504 | 12/1970 | Janssen et al. | 310/51 |
| 4,268,233 | 5/1981 | Fernström | 418/270 |
| 4,647,803 | 3/1987 | von der Heide et al. | 310/51 |
| 4,672,250 | 6/1987 | Seitz | 310/90 |
| 4,760,299 | 7/1988 | Dickie et al. | 310/91 |
| 4,816,710 | 3/1989 | Silvaggio et al. | 310/194 |
| 4,823,034 | 4/1989 | Wrobel | 310/67 R |
| 4,965,476 | 10/1990 | Lin | 310/51 |
| 5,079,466 | 1/1992 | Jones | 310/91 |
| 5,097,366 | 3/1992 | Ueki et al. | 360/97.2 |
| 5,126,612 | 6/1992 | Girault | 310/90.5 |
| 5,200,866 | 4/1993 | Frugè | 360/99.08 |
| 5,227,686 | 7/1993 | Ogawa | 310/90 |
| 5,235,227 | 8/1993 | Fazekas | 310/51 |
| 5,241,229 | 8/1993 | Katakura et al. | 310/51 |
| 5,352,947 | 10/1994 | MacLeod | 360/98.07 |
| 5,367,418 | 11/1994 | Chessman et al. | 360/99.12 |
| 5,376,850 | 12/1994 | Elsing et al. | 310/67 |
| 5,457,588 | 10/1995 | Hattori et al. | 360/99.08 |
| 5,519,270 | 5/1996 | Yamada et al. | 360/98.07 |
| 5,579,188 | 11/1996 | Dunfield et al. | 360/99.08 |

FOREIGN PATENT DOCUMENTS

| | | |
|---|---|---|
| 770273 | 10/1967 | Canada ............... 310/70 |
| 3-89838 (A) | 4/1991 | Japan. |
| 4-168942 (AA) | 6/1992 | Japan. |
| 4-251542 (A) | 9/1992 | Japan. |
| 4-364340 (A) | 12/1992 | Japan. |
| 2 154 072 | 8/1985 | United Kingdom. |

*Primary Examiner*—Jefferson Evans
*Attorney, Agent, or Firm*—Westman, Champlin & Kelly, P.A.

[57] ABSTRACT

A disc drive spindle motor for rotating at least one disc in a data storage device includes a base, a shaft, a rotor and a stator. A bearing interconnects the rotor with the shaft and allows the rotor to rotate about the shaft. An overmold encapsulates at least a portion of the stator and provides the stator with a smooth external surface. The overmold mechanically isolates the stator from the base and damps sympathetic vibrations in the stator structure to reduce the generation of acoustic noise in the storage device.

31 Claims, 14 Drawing Sheets

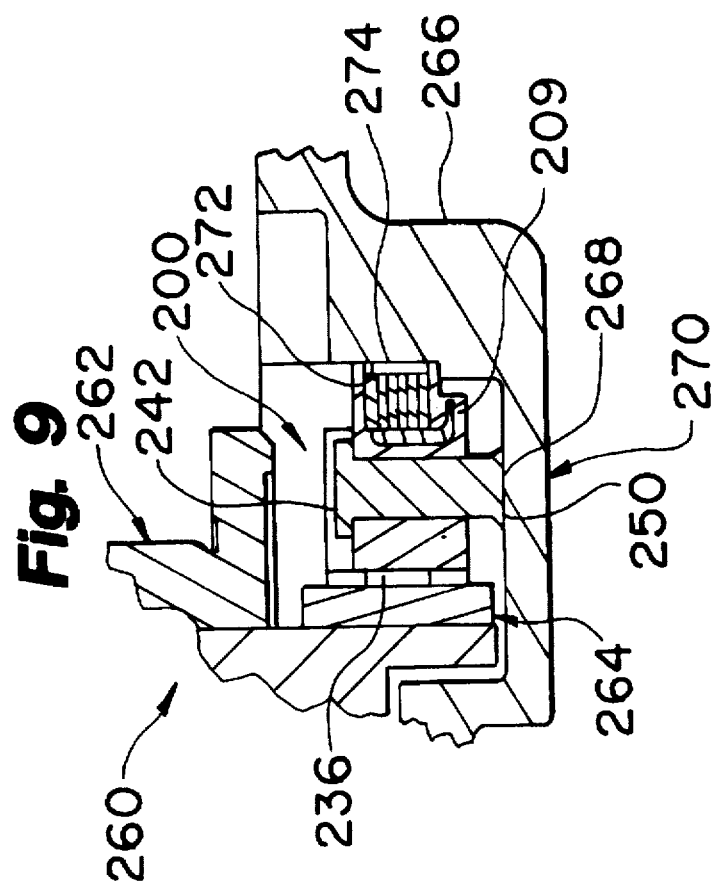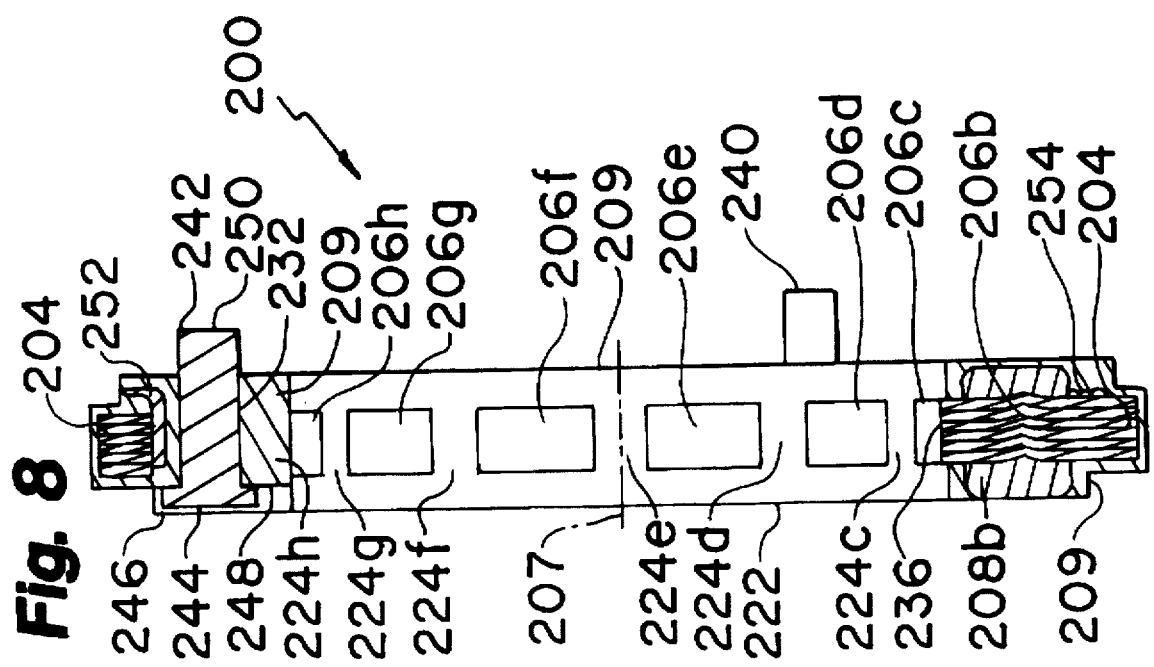

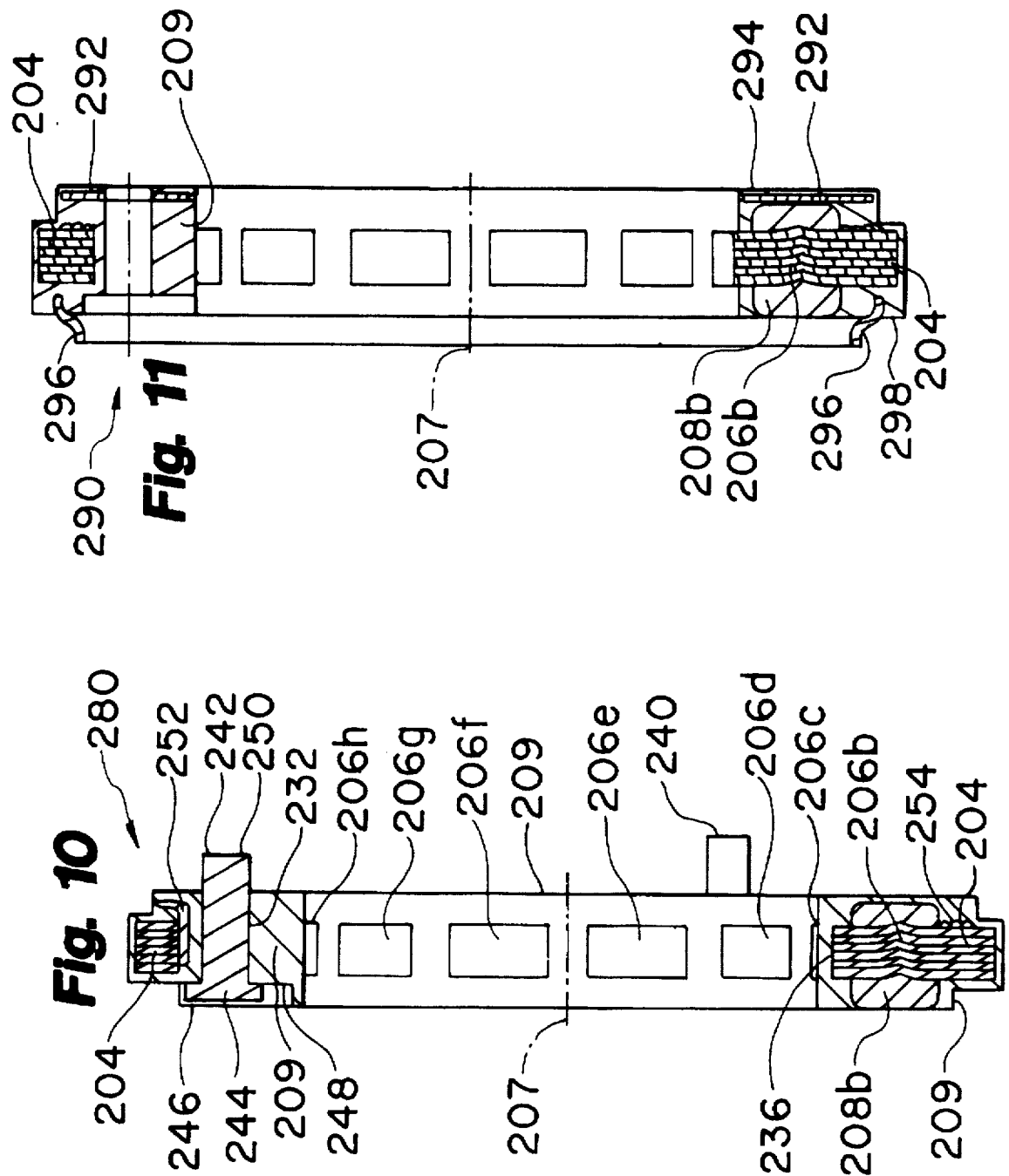

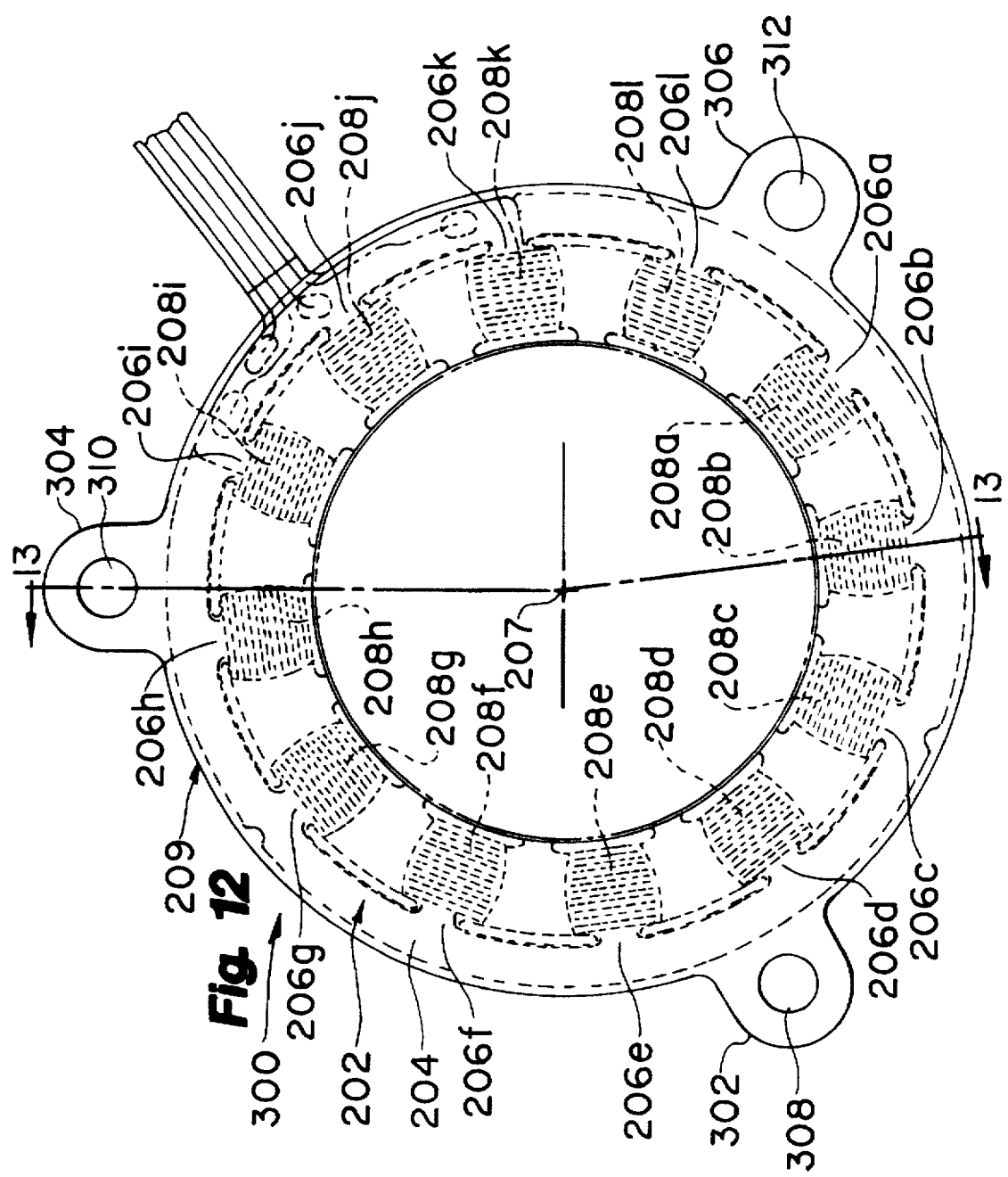

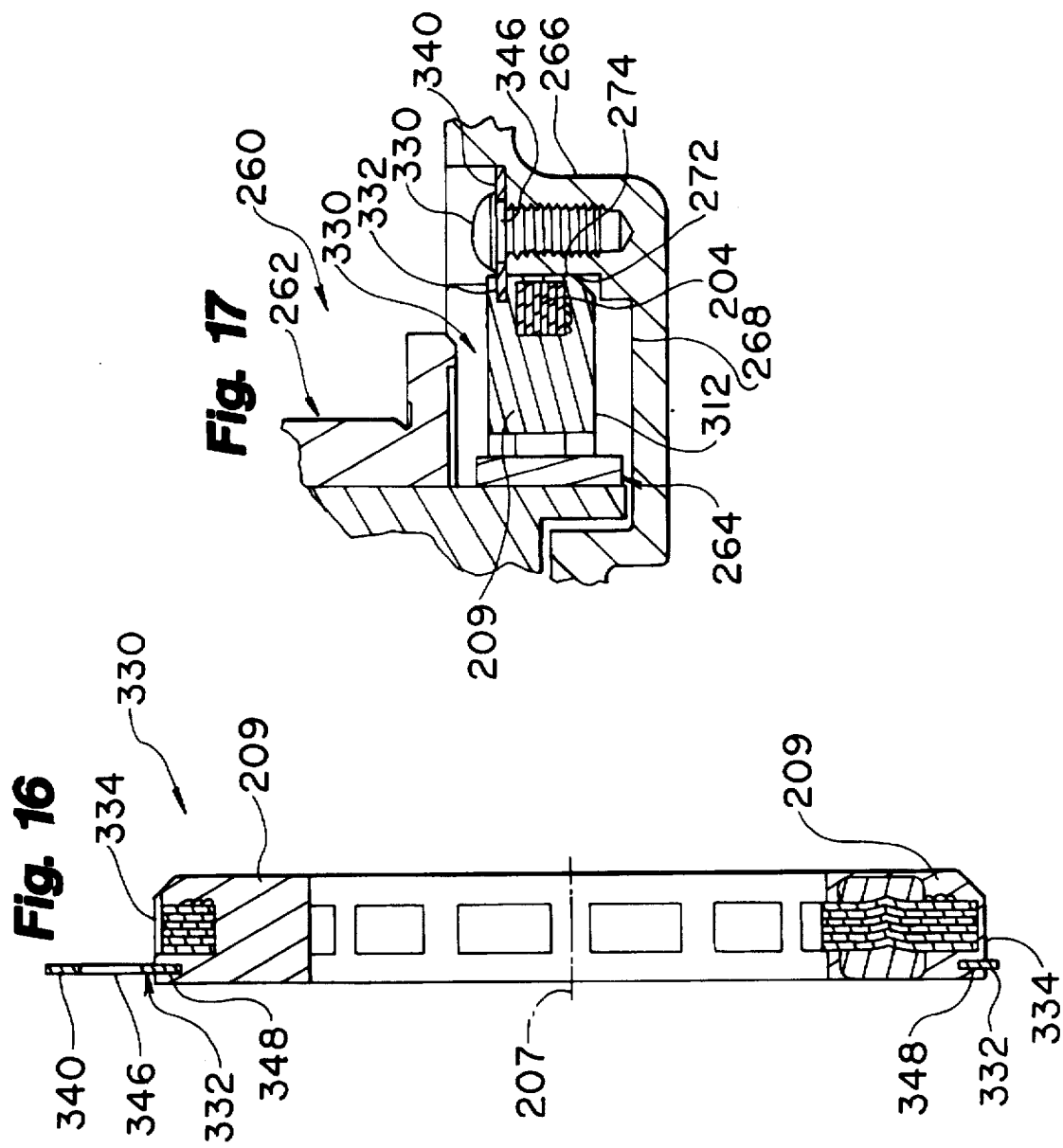

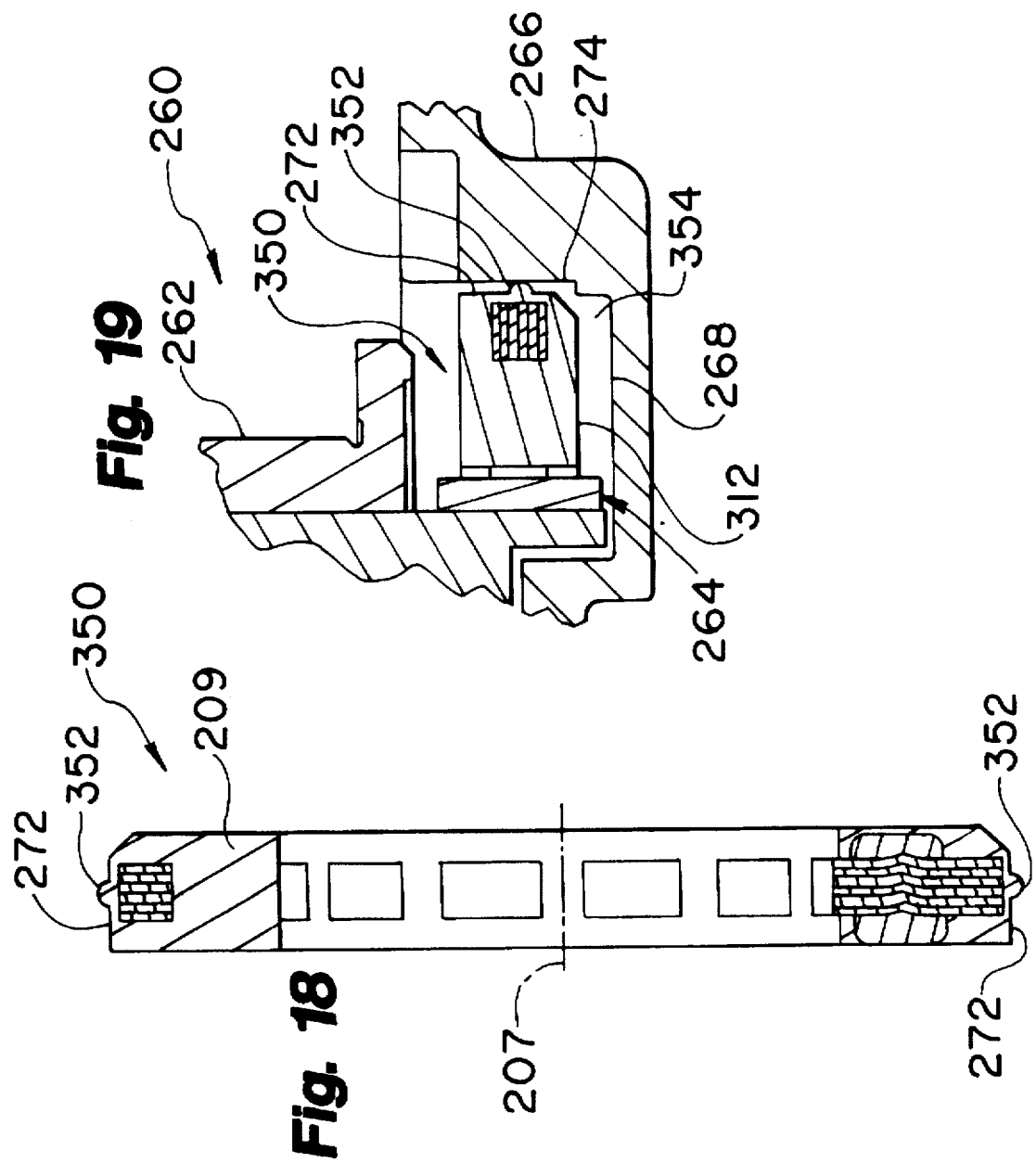

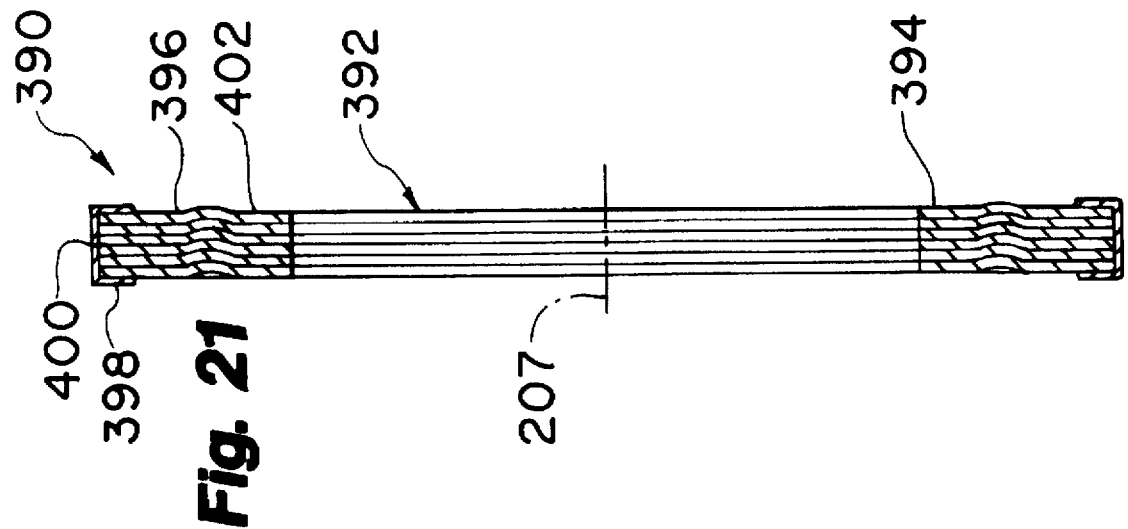
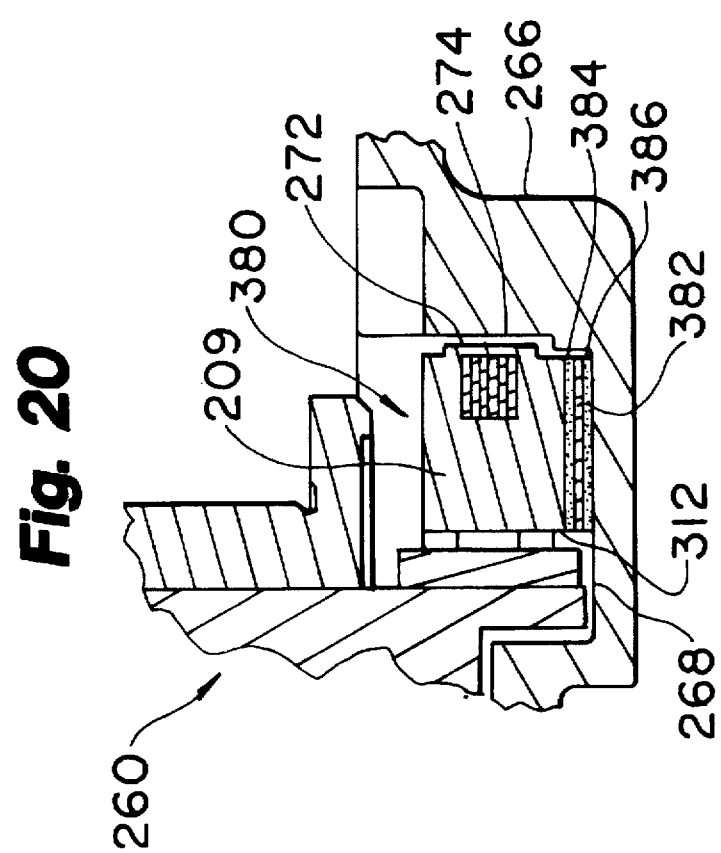

SPINDLE MOTOR HAVING OVERMOLDED STATOR

CROSS-REFERENCE TO RELATED APPLICATION

This application is a continuation-in-part of U.S. Ser. No. 08/386,883, filed Feb. 10, 1995.

BACKGROUND OF THE INVENTION

The present invention relates generally to the field of disc drive spindle motors for data storage devices and, more particularly, to a spindle motor in which the stator has a resilient overmold to isolate the stator from a base of the storage device.

Disc drive data storage devices, known as "Winchester" type disc drives, are well-known in the industry. In a Winchester disc drive, digital data are written to and read from a thin layer of magnetizable material on the surface of rotating discs. Write and read operations are performed through a transducer which is carried in a slider body. The slider and transducer are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes a self-acting hydrodynamic air bearing surface. As the disc rotates, the disc drags air beneath the air bearing surface, which develops a lifting force that causes the slider to lift and fly several microinches above the disc surface.

In the current generation of disc drive products, the most commonly used type of actuator is a rotary moving coil actuator. The discs themselves are typically mounted in a "stack" on the hub structure of a brushless DC spindle motor. The rotational speed of the spindle motor is precisely controlled by motor drive circuitry which controls both the timing and the power of commutation signals directed to the stator windings of the motor.

The first Winchester disc drives to be produced were large cabinet models which included discs having a diameter of 14 inches and AC induction spindle motors. These types of disc drives were commonly located in dedicated "computer rooms" with large mainframe computers, where environmental factors such as temperature and humidity could be carefully controlled. In this type of environment, the acoustic noise generated by cooling fans and disc drive motors was of little concern, since the only persons directly in contact with the systems were maintenance personnel, who were generally not in the computer rooms for extended periods of time. The users of such systems were typically located at a remote location and communicated with the computer system via keyboards and display terminals which did not generate excessive amounts of acoustic noise.

More recently, personal computers have become more popular and are commonly located within the work space of the system user. This has prompted an increase in awareness of acoustic noise generated by the disc drives located within the personal computers. In certain markets, such as Europe, the amount of acoustic noise allowable in the work place is closely regulated. With this in mind, it has become common for system manufacturers to impose a "noise budget" on manufacturers of major system components, such as disc drives, which limits the amount of acoustic noise that such components can contribute to the overall noise of the system.

One of the principal sources of noise in disc drive data storage devices is the spindle motor which drives the discs at a constant speed. Typical spindle motor speeds have been in the range of 3600 RPM. Current technology has increased spindle motor speeds to 4800 RPM, 7200 RPM and above. Analysis of various types of disc drives has brought to light several different modes of acoustic noise generation which are attributable to the spindle motor and its control logic.

One mode of noise generation is sympathetic vibration of the disc drive housing in response to the rotating mass of the spindle motor. Another mode of acoustic noise generation is electromagnetic disturbances caused by the excitation of the stator mass by the application and removal of the commutation pulses that are used to drive the motor and control its speed. The commutation pulses are timed, polarization-selected DC current pulses which are directed to sequentially selected stator windings. The rapid rise and fall times of these pulses act as a striking force and set up sympathetic vibrations in the stator structure.

If the stator structure is rigidly connected to the disc drive housing, either directly or through a rigid material, these vibrations are coupled to the housing and generate resonant vibrations in the housing causing unacceptable levels of acoustic noise.

Prior art attempts to reduce or eliminate noise include controlling the resonant frequency of the housing, and damping the vibration of the housing. In U.S. Pat. No. 5,376,850, acoustic noise is reduced by uncoupling the stator from hard contact with the stationary portion of the shaft. A plurality of O-rings interposed radially between the stator and the shaft of the spindle motor. Also, a non-metallic washer is positioned at one end of the shaft and an axial O-ring is positioned at the other end of the shaft.

SUMMARY OF THE INVENTION

The present invention is a disc drive spindle motor for rotating at least one disc in a data storage device. The motor includes a base, a stationary member, a rotor and a stator. A bearing interconnects the rotor with the stationary member and allows the rotor to rotate about the stationary member. An overmold encapsulates at least part of the stator and provides the stator with a smooth external surface. The overmold mechanically isolates the stator from the base and damps sympathetic vibrations in the stator structure to reduce the generation of acoustic noise in the storage device.

The overmold provides a convenient structure for mounting the stator to the base. In one embodiment, the stator includes a plurality of phase windings which are disposed about the stator and spaced apart by gaps. The overmold fills the gaps and substantially encapsulates the stator. A plurality of mounting apertures extend in an axial direction through the overmold in the gaps between the phase windings. A mounting pin extends through each mounting aperture and has a distal end which can be attached to the base by heat-staking, for example.

In another embodiment, the overmold comprises at a plurality of mounting ears extending from a circumference of the stator in a radial direction for connection to the base. The mounting ears can include a rigid material, such as plastic or metal, which is encapsulated by the overmold or exposed to provide a rigid yet isolated connection.

In another embodiment, the overmold has a circumferential side wall opposite to the rotor having an annular raised projection. The projection is compressed between the stator and the base to secure the stator within the base. In yet another embodiment, the stator is adhered to the base through a polyester plastic film having first and second surfaces which carry a pressure sensitive adhesive.

While the present invention is useful in disc drive spindle motors having ball bearings, the present invention is particularly useful in hydrodynamic bearing motors to reduce or eliminate pure vibration tones which become more noticeable with lower levels of background vibration. The overmolded stator can have an axial position which is within or below the hub, and can have a radial position which is internal or external to the rotor. The overmold provides the stator with an environmental seal having a smooth external surface which is substantially free of apertures. The overmold can be cleaned more easily during production than a bare stator and therefore reduces impurities in the disc drive. The overmold provides a large surface area over which vibrations can be damped to reduce acoustic noise generation. The overmold also allows a greater integration of parts which reduces the number of parts that must be assembled in the disc drive.

BRIEF DESCRIPTION OF THE DRAWINGS

FIG. 8 is a sectional view of the stator shown in FIG. 7, taken along lines 7—7.

FIG. 9 is a fragmentary sectional view of a spindle motor having the stator shown in FIGS. 7 and 8.

FIG. 10 is a sectional view of a fully encapsulated stator.

FIG. 11 is a sectional view of a overmolded stator having flux shields.

FIG. 12 is a plan view of an overmolded stator having mounting ears.

FIG. 16 is a sectional view of the stator shown in FIG. 15, taken along lines 16—16.

FIG. 17 is a fragmentary sectional view of a spindle motor having the stator shown in FIGS. 15 and 16.

FIG. 18 is a sectional view of an overmolded stator with an annular projection.

FIG. 19 is a fragmentary sectional view of a spindle motor having the stator shown in FIG. 18.

FIG. 20 is a fragmentary sectional view of a spindle motor in which an overmolded stator is adhered to the base through a polyester plastic film.

FIG. 21 is a sectional view of an overmolded stator in which the overmold is limited to an outer diameter of the stator.

DETAILED DESCRIPTION OF THE PREFERRED EMBODIMENTS

Figure 1:
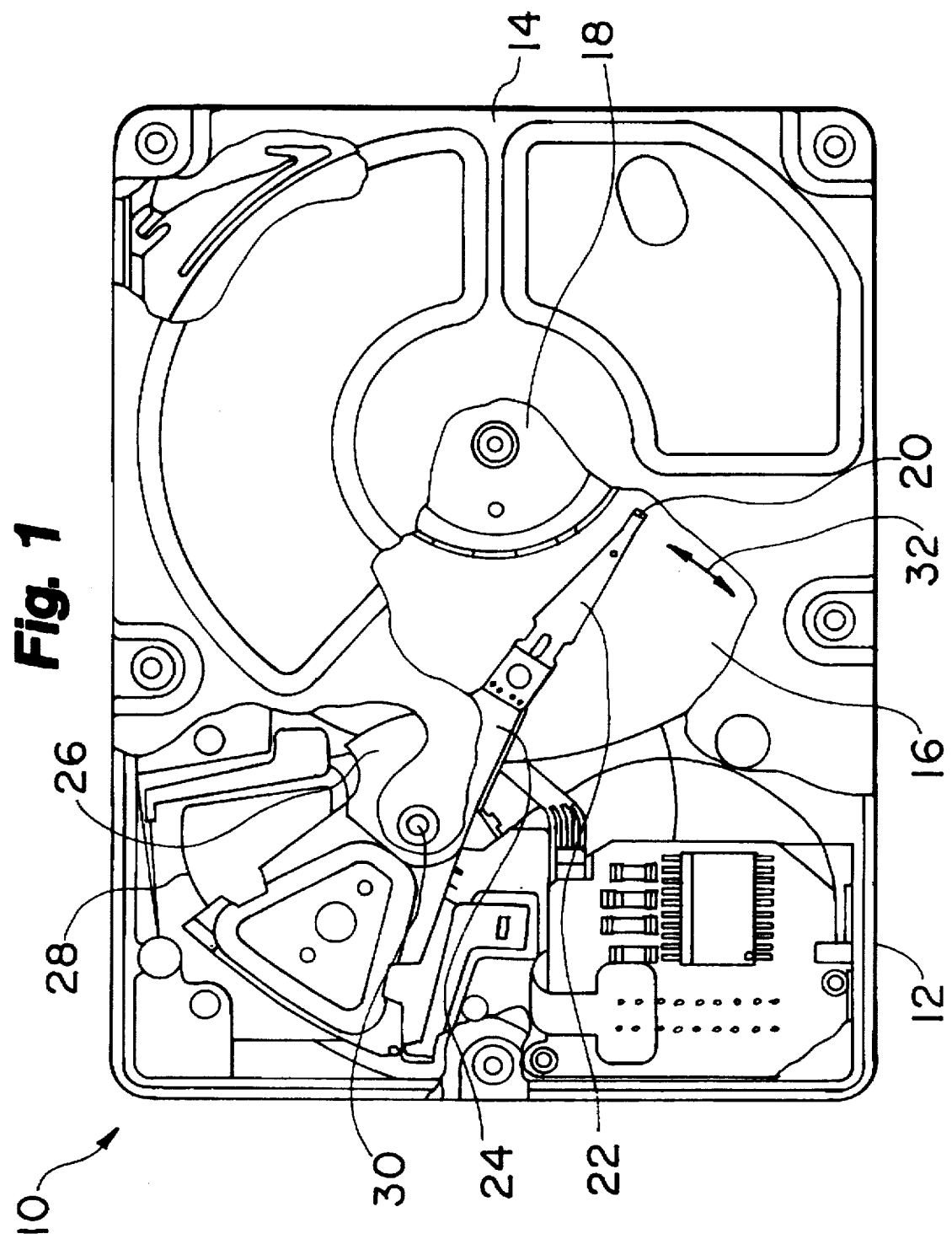
FIG. 1 is a top plan view of a disc drive data storage device, in accordance with the present invention.

The present invention is a spindle motor for a disc drive data storage device in which the stator is isolated from the base to reduce acoustic levels in the storage device. FIG. 1 is a plan view of a typical disc drive 10 in which the present invention is useful. Disc drive 10 includes a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the present invention is not limited to the configuration of the disc drive housing. For example, disc drives have been manufactured using a vertical split between two housing members. In such drives, that portion of the housing half which connects to the lower end of the spindle motor is analogous to base 12, while the opposite side of the same housing member, which is connected to or adjacent the top of the spindle motor, is functionally the same as the top cover 14.

Disc drive 10 further includes a disc pack 16 which is mounted for rotation on a spindle motor (not shown) by a disc clamp 18. Disc pack 16 includes a plurality of individual discs which are mounted for co-rotation about a central axis. Each disc surface has an associated head 20 which is mounted to disc drive 10 for communicating with the disc surface. In the example shown in FIG. 1, heads 20 are supported by flexures 22 which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the present invention is also useful in disc drives having other types of actuators, such as linear actuators.

Figure 2:
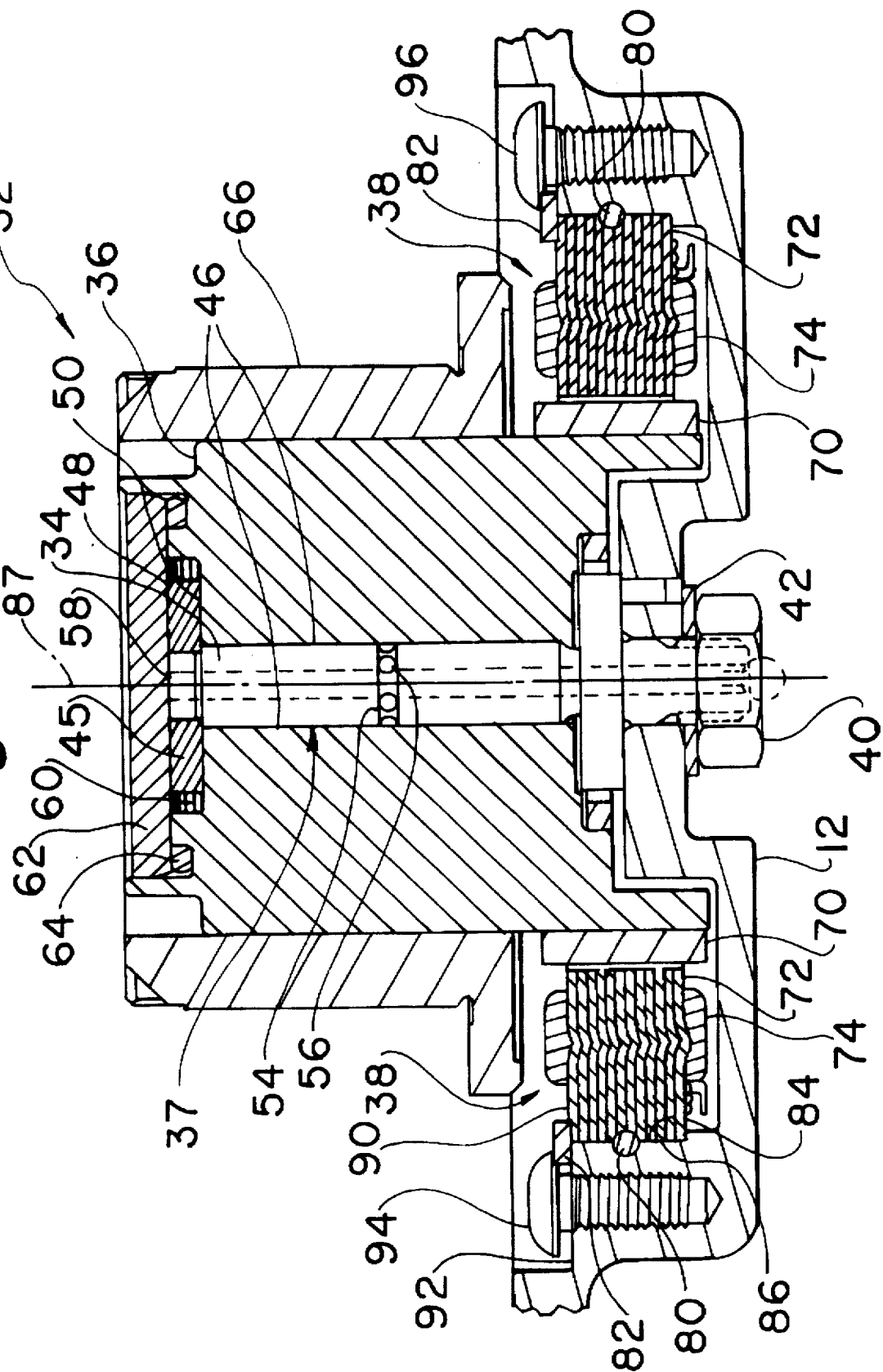
FIG. 2 is a sectional view of an isolated hydrodynamic bearing spindle motor in accordance with the present invention.

FIG. 2 is a sectional view of a hydrodynamic bearing spindle motor 32 in accordance with the present invention. Spindle motor 32 includes a stationary member 34, a hub or sleeve 36 and a stator 38. In the embodiment shown in FIG. 2, the stationary member is a shaft which is fixed and attached to base 12 through a nut 40 and a washer 42. Hub 36 is interconnected with shaft 34 through a hydrodynamic bearing 37 for rotation about shaft 34. Bearing 37 includes a radial working surface 46 and axial working surfaces 48 and 50. Shaft 34 includes fluid ports 54, 56 and 58 which supply hydrodynamic fluid 60 and assist in circulating the fluid along the working surfaces of the bearing. Hydrodynamic fluid 60 is supplied to shaft 34 by a fluid source (not shown) which is coupled to the interior of shaft 34 in a known manner.

Spindle motor 32 further includes a thrust bearing 45 which forms the axial working surfaces 48 and 50 of hydrodynamic bearing 37. A counterplate 62 bears against working surface 48 to provide axial stability for the hydrodynamic bearing and to position hub 36 within spindle motor 32. An O-ring 64 is provided between counterplate 62 and hub 36 to seal the hydrodynamic bearing. The seal prevents hydrodynamic fluid 60 from escaping between counterplate 62 and hub 36.

Hub 36 includes a disc carrier member 66 which supports disc pack 16 (shown in FIG. 1) for rotation about shaft 34. Disc pack 16 is held on disc carrier member 66 by disc clamp 18 (also shown in FIG. 1). A permanent magnet 70 is attached to the outer diameter of hub 36, which acts as a rotor for spindle motor 32.

Stator 38 is formed of a stack of stator laminations 72 and associated stator windings 74. In accordance with the present invention, stator 38 is mechanically isolated from base 12 through a resilient coupling. It has been found through experiments that hydrodynamic bearing motors are much quieter and in general have lower background vibration levels than motors having ball bearings. Because the background vibration levels are less in a hydrodynamic bearing motor, vibration responses to electromagnetic disturbances become more noticeable since the responses are no longer hidden in the background. Therefore, it is desirable to reduce or eliminate as far as possible the transfer of vibrations resulting from electromagnetic disturbances from the stator to the base.

As shown in FIG. 2, stator 38 is resiliently coupled to, but mechanically isolated from, base 12. Stator 38 is coupled to base 12 through an O-ring 80 and a resilient damping bridge 82. O-ring 80 is compressed between a side surface 84 of stator 38 and a side surface 86 of base 12 such that stator 38 and base 12 are adjacent to, but spaced from, one another in a radial direction with respect to a central axis 87. In one embodiment, O-ring 80 is integrated in stator 38 to form an assembly which facilitates a low-cost approach to mounting the stator within base 12. For example, O-ring 80 can be integrated in an indentation (not shown) in stator 38 through a vulcanizing process. O-ring 80 can also be integrated in stator 38 by over-molding the O-ring onto the stator. The O-ring material flows over the stator to form the desired O-ring features and is then hardened at a selected temperature and pressure. The vulcanizing process and the over-molding process are controlled to provide the desired damping and stiffness characteristics.

Base 12 includes a corresponding annular groove (not labeled) which retains O-ring 80 under compression when stator 38 is mounted within base 12. The annular groove within base 12 also assists in axially constraining O-ring 80. O-ring 80 can be formed as a continuous internal ring or as one or more individual pieces of O-ring material positioned between stator 38 and base 12. O-ring 80 can have any suitable cross section, such as circular or rectangular.

O-ring 80 can be formed of a rubber-like or plastic-like material having high stiffness and high vibration damping characteristics. In a preferred embodiment, O-ring 80 is formed of an approximately 40–75 durometer (Shore A) material having a damping ratio of at least 2 decibels in an acoustic frequency range of approximately 100 Hz to 10 KHz. The material absorbs energy of acoustic vibrations and dissipates the energy as heat. In some embodiments, O-ring 80 preferably has a damping ratio of at least 5 decibels. The preferred damping ratio depends on the type of bearing used, among other factors. With ball bearings, the background vibration level is higher. Electromagnetic disturbances are more hidden and require less damping. A damping ratio of 2–3 decibels may be sufficient. With hydrodynamic bearings, electromagnetic disturbances are more noticeable.

A larger damping ratio is therefore preferred with hydrodynamic bearings.

An example of a suitable material is a 70 durometer material such as Viton®, a patented polymer product of E.I. DuPont de Nemours Co., of Wilmington, Del., which is subjected to 0.009 inches of radial compression. Other materials which provide suitable isolation and stiffness may also be used to isolate stator 38 from base 12. It has been found that some rubber materials contain silicone or sulfur which can be harmful to the various components in a disc drive. Therefore, rubber or rubber-like materials not containing silicone and sulfur are preferred.

Resilient bridge 82 extends between an upper mounting surface 90 of stator 38 and an upper mounting surface 92 of base 12. Bolts 94 and 96 secure bridge 82 to base 12 and compress bridge 82 against the upper mounting surfaces 90 and 92 in an axial direction to provide additional vertical stiffness for the resilient coupling between stator 38 and base 12. The combination of O-ring 80 and resilient bridge 82 clamps stator 38 rotationally and vertically with respect to base 12. The O-ring preferably has enough torsional stiffness so that as spindle motor 32 begins to rotate, stator 38 is not allowed to rotate more than an insignificant amount. The combination of O-ring 80 and resilient bridge 82 provides sufficient vertical and torsional stiffness.

Resilient bridge 82 is preferably formed of a material similar to that of O-ring 80. Resilient bridge 82 can be an annular ring, as shown in FIG. 2, or can include one or more individual bridge pieces which extend between stator 38 and base 12. In addition, bridge 82 can be formed as a washer which is secured to base 12 by a bolt, such as bolt 94 or 96. The washer would have a tab that would extend between base 12 and stator 38. Resilient bridge 82 can also be formed as a clamp of O-ring type material. Further, bridge 82 can be compressed against the upper mounting surfaces 90 and 92 in several ways. For example, resilient bridge 82 can be compressed by bolt 94, as shown in FIG. 2, or can be compressed by a portion of top cover 14 (shown in FIG. 1). The mounting surfaces 90 and 92 can also include associated grooves for accepting resilient bridge 82. In addition, resilient bridge 82 can be integrated into the stator similar to O-ring 80.

In the embodiment shown in FIG. 2, the spindle motor is a "below-hub" type motor in which stator 38 is positioned below hub 36, as opposed to within hub 36. In addition, stator 38 is located externally from hub 36 and is attached directly to base 12. In this embodiment, O-ring 80 and resilient damping bridge 82 are located at an outer diameter of stator 38.

Figure 3:
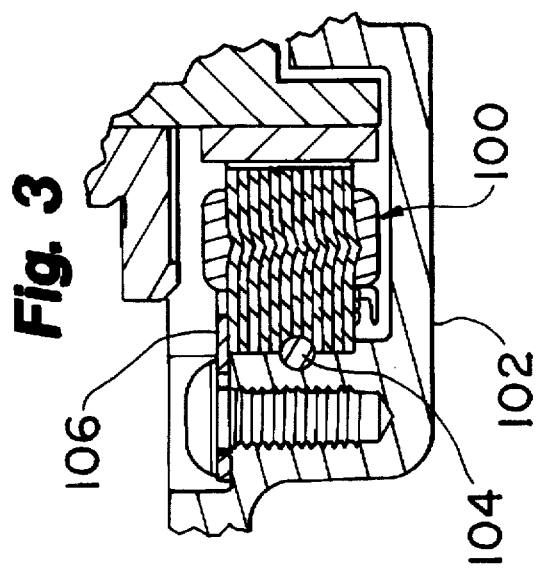
FIG. 3 is a fragmentary sectional view of an alternative attachment between the stator and the base in which the stator is partially isolated from the disc.

FIG. 3 is a fragmentary sectional view of a spindle motor which illustrates an alternative attachment between the stator and the base. In FIG. 3, stator 100 is attached to base 102 through an O-ring 104 and a metallic C-clamp 106. C-clamp 106 provides sufficient vertical stiffness between stator 100 and base 102 but does not provide complete isolation between the stator and the base as does the embodiment shown in FIG. 2. Therefore, the embodiment shown in FIG. 2 is preferred over the embodiment shown in FIG. 3.

Figure 4:
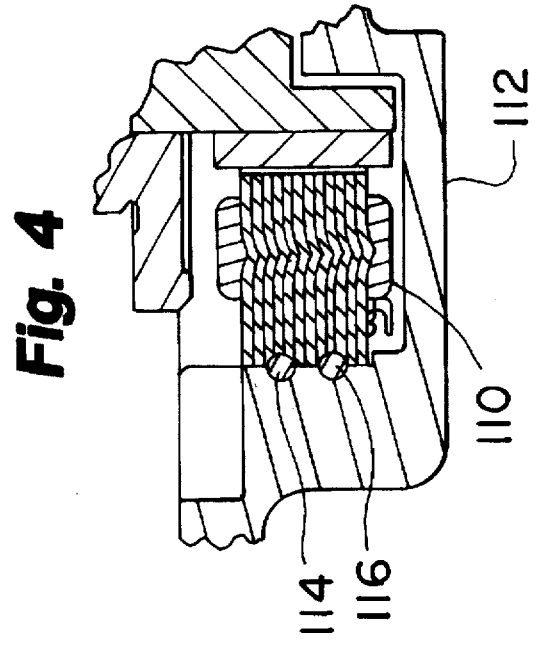
FIG. 4 is a fragmentary sectional view of an alternative attachment between the stator and the base which includes two O-rings for isolation.

FIG. 4 is a fragmentary sectional view of a spindle motor illustrating another alternative attachment between the stator and the base. In FIG. 4, stator 110 is attached to base 112 through two O-rings 114 and 116. O-rings 114 and 116 are located radially between stator 110 and 112. O-rings 114 and 116 are separated from one another by a radius such that they form a couple which contributes to the vertical and torsional stiffness of stator 110 with respect to base 112. If the stator is rotated with respect to the base, the O-rings provide a restoring torque to overcome the rotation. The O-rings also maintain vertical alignment of the stator by providing a restoring force in a vertical direction in response to vertical movement of the stator with respect to the base. In the embodiment shown in FIG. 4, there is no need for a clamp or a bridge between stator 110 and base 112 since O-rings 114 and 116 provide sufficient vertical and torsional stiffness.

Figure 5:
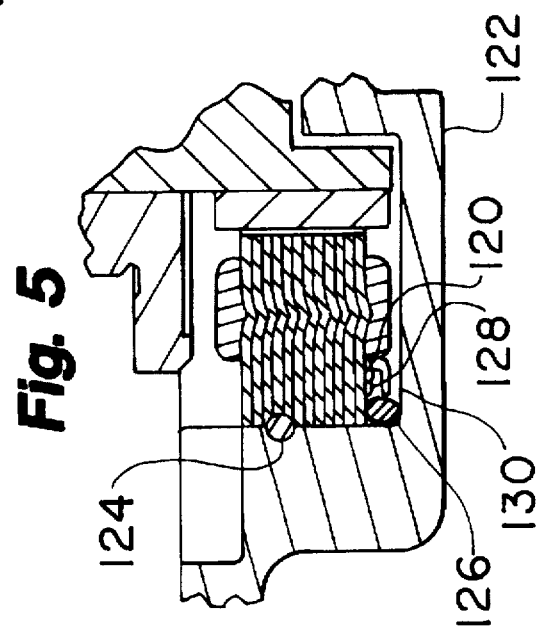
FIG. 5 is a fragmentary sectional view of another alternative attachment between the stator and the base which includes an O-ring located radially between the stator and the base and an O-ring located axially between the stator and the base.

FIG. 5 is a fragmentary sectional view of a spindle motor which illustrates another embodiment of the present invention. In FIG. 5, stator 120 is resiliently coupled to base 122 through O-rings 124 and 126. O-ring 124 is located radially between stator 120 and base 122. O-ring 124 is compressed between the side walls of stator 120 and base 122 similar to the O-rings shown in FIGS. 2–4. O-ring 126 is located axially and compressed between a lower mounting surface 128 of stator 120 and an opposing surface 130 of base 122. O-ring 126 provides additional stability and isolation. rectangular.

While the present invention is particularly useful in hydrodynamic bearing motors to reduce pure tone vibrations where the background vibration level is relatively low, the present invention is also useful in motors having ball bearings to reduce or eliminate the transfer of vibrations from the stator to the base.

Figure 6:
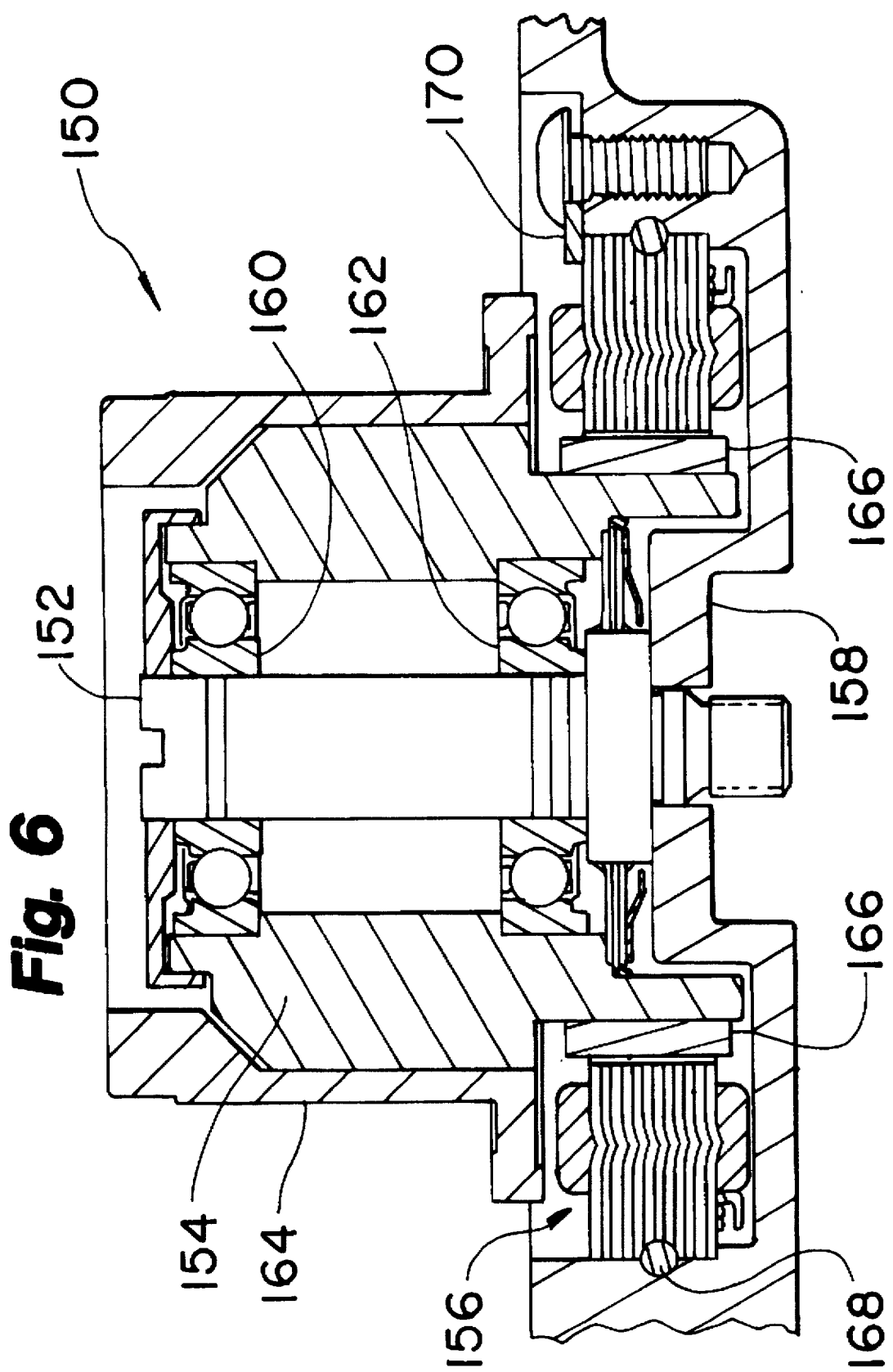
FIG. 6 is a sectional view of a ball bearing spindle motor, in accordance with the present invention.

FIG. 6 illustrates a spindle motor having ball bearings, as opposed to a hydrodynamic bearing. Spindle motor 150 includes a shaft 152, a hub 154 and a stator 156. Shaft 152 is a stationary shaft which is fixedly attached to a base 158. Shaft 152 is also attached to the inner races of ball bearings 160 and 162. Hub 154 is attached to the outer races of bearings 160 and 162 for rotation about shaft 152. Hub 154 includes a disc carrying member 164 which carries a plurality of magnetic discs (not shown) for rotation about shaft 152. Hub 154 also carries a permanent magnet 166 which forms a rotor for spindle motor 150.

As in the embodiments shown in FIGS. 2–5, stator 156 can be attached to base 158 through one or more resilient couplings, such as O-ring 168. Spindle motor 150 can also include a resilient damping ring or tab 170 for providing additional vertical stiffness between stator 156 and base 158. As discussed above, damping ring or tab 170 is optional. Alternatively, spindle motor 150 can be provided with a metallic C-clamp as shown in FIG. 3, two O-rings as shown in FIG. 4, or an additional O-ring located between the bottom of stator 156 and base 158.

FIGS. 1–6 illustrate embodiments in which the stator is positioned external to the hub such that the O-rings are positioned along the outer diameter of the stator. However, the O-rings can also be positioned along the inner diameter of the stator in embodiments in which the stator is attached to the base about the stator's inner diameter.

Figure 7:
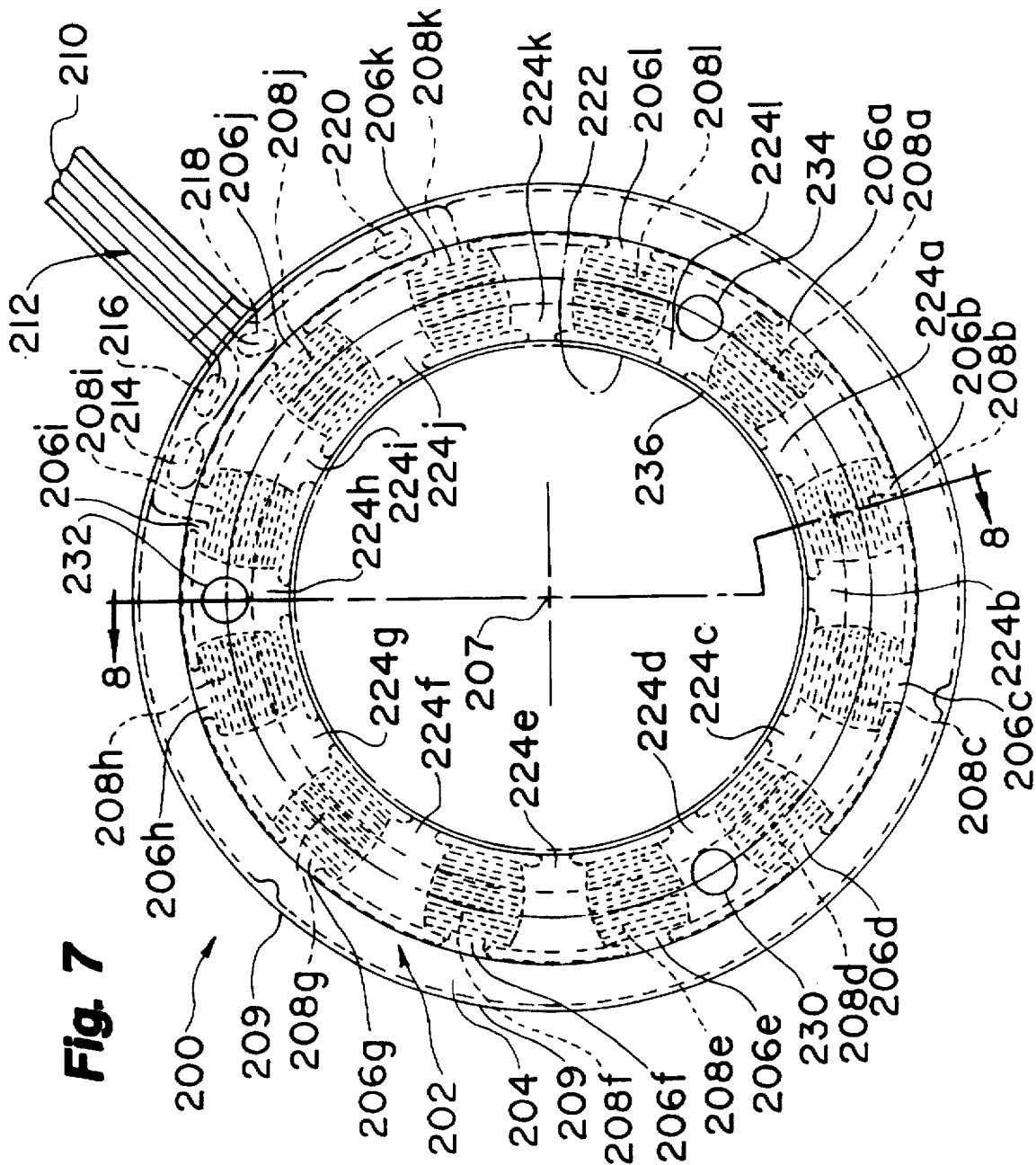
FIG. 7 is a plan view of an overmolded stator in accordance with the present invention.

FIG. 7 is a plan view of a stator in which the resilient coupling is integrated with the stator by overmolding the coupling onto the stator. FIG. 8 is a sectional view of the stator, taken along lines 8—8 of FIG. 7. Stator 200 includes a stator lamination 202 comprising a back-iron 204 and a plurality of teeth 206a–206l, which extend inward from back-iron 204 toward a central axis 207. Teeth 206a–206l are disposed about a circumference 222 of stator 200. A plurality of phase windings 208a–208l are wound on stator teeth 206a–206l, respectively, for magnetic communication with an internal rotor (not shown). Phase windings 208a–208l can have a number of winding configurations, such as those discussed in Dunfield et al. U.S. Ser. No. 08/469,643, entitled IRONLESS HYDRODYNAMIC SPINDLE MOTOR, filed Jun. 6, 1995, and Dunfield et al. U.S. Ser. No. 08/400,661, entitled HYDRODYNAMIC SPINDLE MOTOR HAVING DISTRIBUTED WINDINGS, filed Mar. 8, 1995, which are hereby incorporated by reference.

A flexible printed circuit (FPC 210 carries a plurality of conductors 212 which are electrically connected to start and finish winding terminations 214, 216,218 and 220. Terminations 214,216, and 218 and 220 are electrically connected to phase windings 208a–208l, in a known manner.

Back-iron 204, stator teeth 206a–206l and windings 208a–208l are overmolded by a resilient rubber-like or plastic-like material. Gaps 224a–224l are formed between each phase winding 208a–208l. Overmold 209 substantially encapsulates stator 200 and fills gaps 224a–224l such that stator 200 has a smooth external surface which is substantially free of apertures, indentations or open cavities. This provides an environmental seal and a surface which can be cleaned much more easily during assembly than a rough and uneven surface provided by an exposed stator. Each of the stator lamination teeth 206a–206l remain exposed at an inner diameter surface 236 along circumference 222 for closer communication with the rotor. In one embodiment, overmold 209 has a minimum thickness of approximately 0.25 mm around the various features of stator 200.

In a preferred embodiment, the overmold material includes a 70 durometer rubber-like material having characteristics similar to the O-rings discussed with reference to FIG. 2. Other rubber-like and plastic-like materials can also be used in the present invention. The overmolding process integrates the resilient coupling with the stator. The overmold material flows over the stator to form the desired overmolding features and is then hardened at a selected temperature and pressure. The overmolding and vulcanizing processes are controlled to provide desired damping and stiffness characteristics. High loss and stiffness characteristics are preferred such that the overmold material damps acoustic vibrations and yet provides structural integrity within the extremely small spacial constraints of a disc drive.

Overmolding stator 200 provides a variety of mounting possibilities. In the embodiment shown in FIGS. 7 and 80 stator 200 includes mounting apertures 230, 232 and 234 which extend through overmold 209 within gaps 224d, 224h and 224l, respectively. Mounting apertures 232 and 234 extend in an axial direction with respect to central axis 207. Spindle motor 200 can include any number of mounting apertures and each aperture can have any cross section, such as circular or rectangle.

As shown in FIG. 8, mounting pins 240 and 242 are inserted into mounting apertures 230 and 232, respectively. Mounting pins 240 and 242 preferably have a cross section which mates with the cross section of mounting apertures 230 and 232. Mounting pins 240 and 242 have a head 244 which rests in a seat 246 within overmold 209 for engaging an upper surface 248 of overmold 209. Mounting pins 240 and 242 have a distal end 250 which is secured to the base of the disc drive spindle motor as shown in greater detail in FIG. 9. Features 252 and 254, shown in FIG. 8, form part of a bobbin which assists in winding phase windings 208a–208l over stator lamination teeth 206a–206l.

FIG. 9 is a fragmentary sectional view of a disc drive spindle motor having the stator shown in FIGS. 7 and 8. Disc drive spindle motor 260 includes a hub 262 and stator 200. Hub 262 carries a magnet 264 which forms a rotor for spindle motor 260. Stator 200 is coaxial with magnet 264 and has a radial position that is external to magnet 264 with respect to central axis 207 (FIG. 7). Stator 200 is mounted to base 266 through mounting pin 242. Distal end 250 of pin 242 is heat-staked to a lower surface 268 of base 266. Mounting pin 242 is preferably formed of a plastic material which melts at distal end 250 when heat is supplied to base 266 (typically aluminum) at area 270. When distal end 250 cools, it adheres to lower surface 268 of base 266, thereby securing stator 200 to base 266.

Overmold 209 mechanically isolates the stator mass from mounting pin 242 and base 266 such that sympathetic vibrations generated in stator 200 are damped by overmold 209 and are not transferred to base 266. Circumferential side wall 272 of overmold 209 can be spaced from corresponding circumferential side wall 274 of base 266 or compressed against side wall 274 to provide additional stability and additional surface area over which acoustic vibrations can be dissipated. Surface 236 is left exposed to the rotor magnet so that overmold 209 does not increase a magnetic gap between teeth 206a–206l and the rotor magnet.

FIG. 10 is a sectional view of an overmolded stator which is fully encapsulated. FIG. 10 is similar to FIG. 8 and uses the same reference numerals for similar elements. Stator 280 includes back-iron 204, stator lamination teeth 206a–206l, windings 208a–208l and overmold 209. In FIG. 10, overmold 209 encapsulates surface 236 of stator lamination teeth 206a–206l.

FIG. 11 is a sectional view of a stator 290 having flux shields according to another embodiment of the present invention. Again, the same reference numerals are used in FIG. 11 as were used in FIGS. 7–10 for similar elements. Stator 290 includes a flux shield 292 positioned along a lower surface 294 and a flux shield 296 positioned along an upper surface 298 of overmold 209. Overmold 209 encapsulates flux shield 292 along lower surface 294. In an alternative embodiment, flux shield 292 can be attached externally to lower surface 294. Surface 294 is referred to as a "lower" surface since it is adjacent the lower surface 268 of base 266 (FIG. 9). Flux shield 296 has a proximal end 299 which is encapsulated by overmold 209. Flux shields 292 and 296 are formed of a magnetic flux conducting metal to assist in focusing an electromagnetic field generated by windings 208a–208l toward rotor magnet 264 (FIG. 9).

FIG. 12 is a plan view of an overmolded stator 300 having alternative mounting features. In FIG. 12, overmold 209 further includes mounting ears 302, 304 and 306 with mounting apertures 308, 310 and 312, respectively. Although stator 300 is shown with three mounting ears, any number of mounting ears can be used with the present invention. Mounting ears 302, 304 and 306 are formed integral with overmold 209 and are used for securing stator 300 to the base of the disc drive spindle motor.

Figure 13:
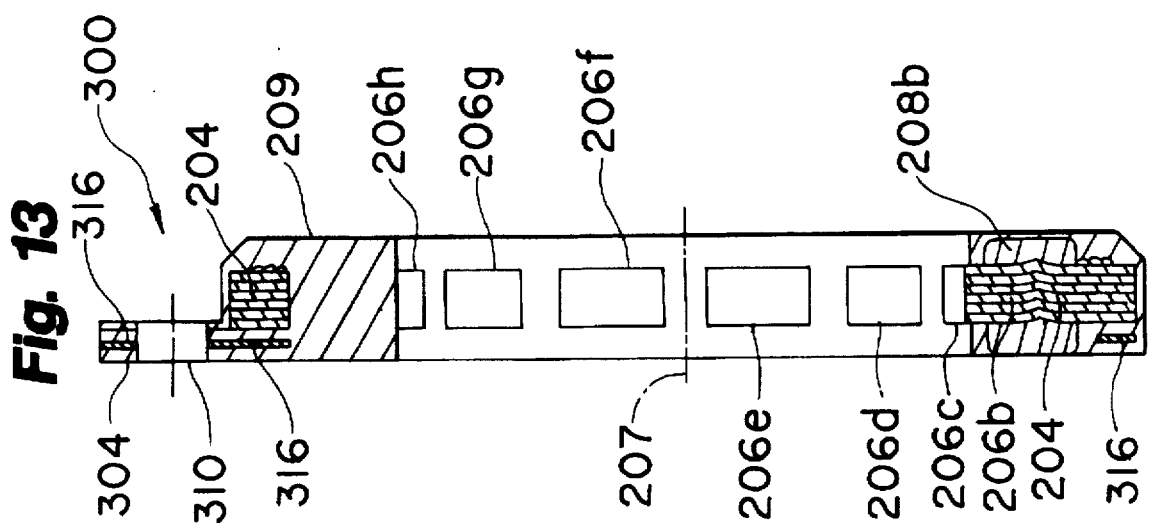
FIG. 13 is a sectional view of the stator shown in FIG. 12, taken along line 13—13.

FIG. 13 is a sectional view of stator 300, as seen from lines 13—13 of FIG. 12. In one embodiment, mounting ear 304 includes a rigid member 316 which is encapsulated in overmold 209 to provide additional stiffness while maintaining mechanical isolation between stator 300 and the base of the disc drive spindle motor. Rigid member 316 can include a rigid plastic or metal material, for example.

Figure 14:
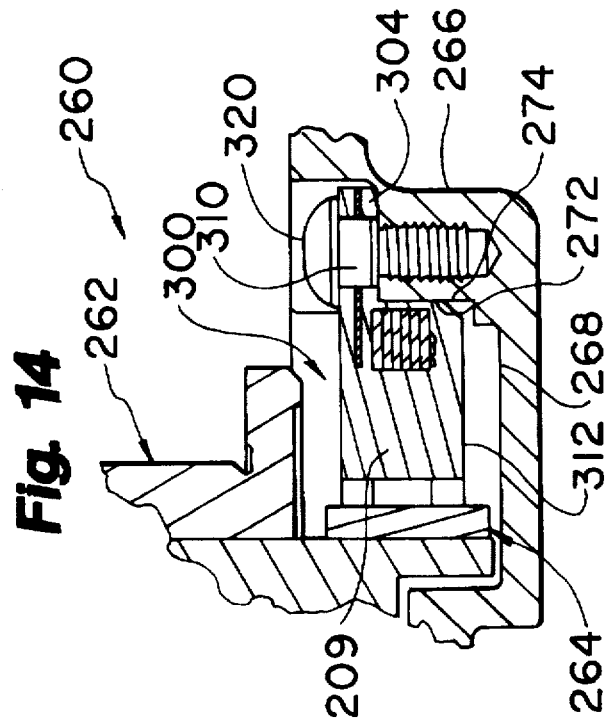
FIG. 14 is a fragmentary sectional view of a spindle motor having the stator shown in FIGS. 12 and 13.

FIG. 14 is a fragmentary sectional view of a disc drive spindle motor having the overmolded stator shown in FIGS. 12 and 13. Stator 300 is secured to base 266 through mounting ear 304 and screw 320. Screw 320 extends through mounting aperture 310 in mounting ear 304 and is threaded into base 266. As in FIG. 9, circumferential side wall 272 of overmold 209 can be spaced from circumferential side wall 274 of base 266 or can be compressed against side wall 274. In addition, lower surface 322 of overmold 209 can be spaced from lower surface 268 of base 266 (as shown in FIG. 14) or compressed against surface 268.

Figure 15:
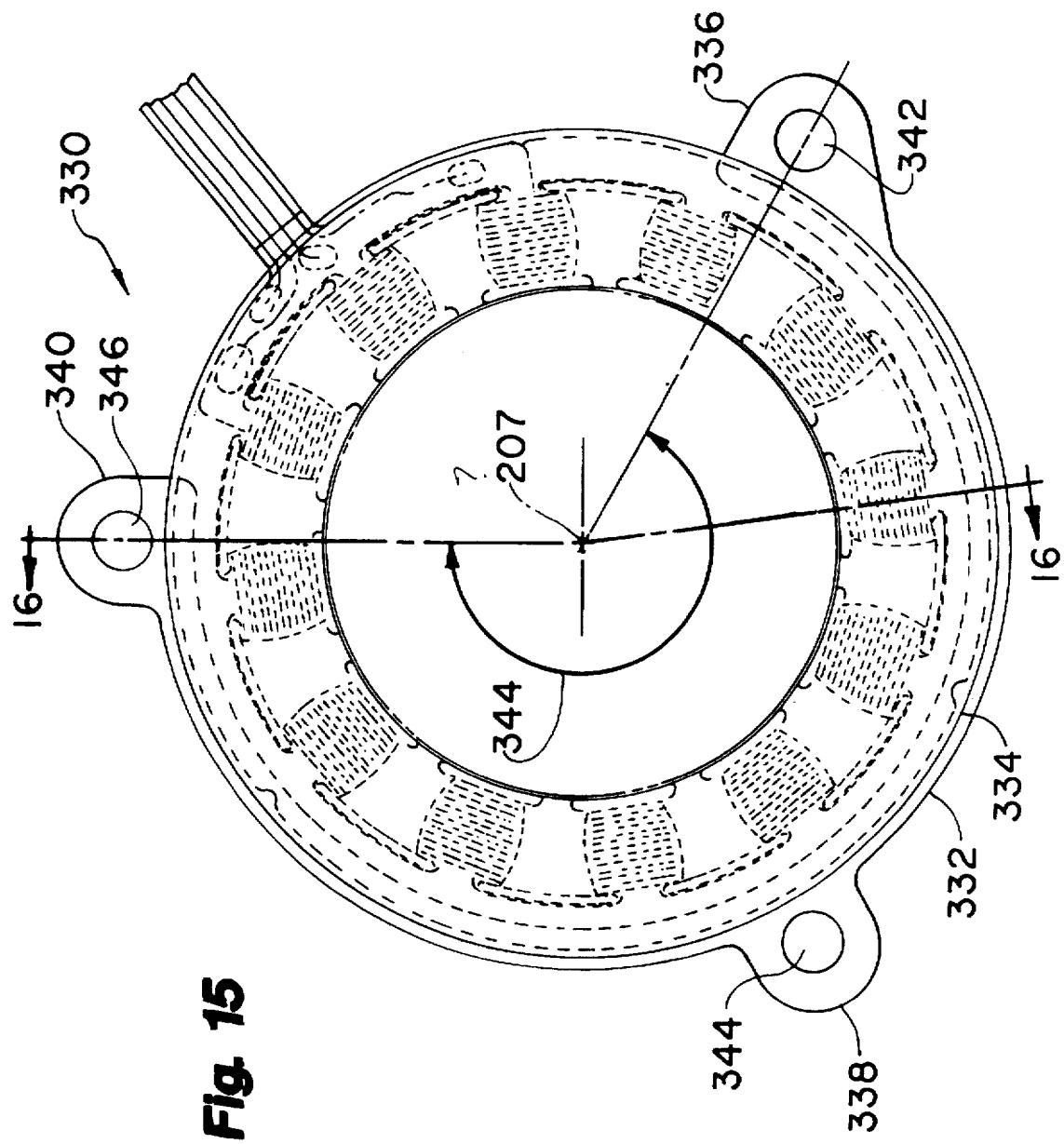
FIG. 15 is a plan view of a overmolded stator having a rigid mounting ring formed within the overmolding.

FIG. 15 is a plan view of an overmolded stator according to another embodiment of the present invention. Stator 330 is similar to the stators shown in FIGS. 7–14 but includes a rigid mounting ring 332 extending partially around a circumference 334 at an outer diameter of stator 330. Mounting ring 332 includes mounting ears 336, 338 and 340 with mounting apertures 342, 344 and 346, respectively. Mounting ears 336, 338 and 340 are similar to mounting ears 302, 304 and 306 shown in FIG. 12, but are formed of a rigid material such as plastic or metal. Mounting ears 338, 340 and 342 extend in a radial direction away from the rotor (see FIG. 17) for attachment to the base. In one embodiment, mounting ring 332 extends less than 270 degrees about circumference 334 of stator 330. For example in FIG. 15, the centers of mounting apertures 342 and 346 are angularly displaced from one another by an angle 344 which is approximately 240 degrees.

FIG. 16 is a sectional view of stator 330 taken along lines 16—16 of FIG. 15. Overmold 209 encapsulates a proximal edge 346 of mounting ring 332, which is adjacent to stator circumference 334. During assembly, mounting ring 332 may be positioned in a fixture with respect to stator 330 before the entire assembly is overmolded by overmold 209. This integrates several distinct component parts into a single component part which is then mounted within the base.

FIG. 17 is a fragmentary sectional view of a disc drive spindle motor having the overmolded stator shown in FIGS. 15 and 16. Again, the same reference numerals are used for similar elements as were used in FIGS. 7–14. Screw 320 extends through mounting aperture 346 of mounting ear 340 to secure stator 330 to base 266. Outer circumferential surface 272 of overmold 209 can be spaced from or compressed against circumferential side surface 274 of base 266. Likewise, lower surface 312 of overmold 209 can be spaced from or compressed against lower surface 268 of base 266.

FIG. 18 is a sectional view of an overmolded stator according to another embodiment of the present invention. Stator 350 includes an overmold 209 having an annular projection 352 on circumferential side wall 272. Projection 352 is preferably formed integral with overmold 209 and extends around the entire circumference of overmold 209. In alternative embodiments, projection 352 includes a plurality of discrete projections or segments about the circumference.

FIG. 19 is a fragmentary sectional view of a disc drive spindle motor having the overmolded stator shown in FIG. 18. Stator 350 is mounted in base 266 by pressing the stator into cavity 354 such that projection 352 is compressed against circumferential side wall 274 of base 266. Projection 352 has a similar function as O-rings 80, 104, 114, 116, 124 and 168 shown in FIGS. 2–6. In an alternative embodiment, overmold 209 can be formed with two or more raised projections which are spaced from one another in an axial direction with respect to the central axis, similar to the embodiment shown in FIG. 4. In addition, overmold 209 can be formed with an annular or segmented projection on lower surface 312 which engages lower surface 268 of base 266, similar to O-ring 126 shown in FIG. 5. In addition, projection 352 can be combined with other mounting features such as those disclosed in FIGS. 2, 3, 6, 9, 14, 17 and 20. As discussed with reference to FIG. 2, projection 352 is preferably subjected to 0.009 inches of radial compression in one embodiment of the present invention. Projection 352 can have any suitable cross section, such as circular or rectangular. Projection 352 preferably has enough torsional stiffness so that as the spindle motor begins to rotate, stator 350 is not allowed to rotate more than an insignificant amount.

FIG. 20 is a fragmentary sectional view of a disc drive spindle motor having an overmolded stator with an alternative mounting feature according to the present invention. In this embodiment, stator 380 is adhered to base 266 through an adhesive film 382. Film 382 is positioned between lower surface 312 of overmold 209 and lower surface 268 of base 266. Film 382 is preferably formed of a plastic material, such as a Mylar® polyester sheet. Film 382 has upper and lower surfaces which carry pressure sensitive adhesive 384 and 386, respectively. Adhesive 384 is adhered to lower surface 312 of overmold 209 while adhesive 386 is adhered to lower surface 268 of base 266. Film 382 can have a single or multiple layer construction and can have any shape, but should have enough surface area to reliably attach stator 380 to base 266. In an alternative embodiment, film 382 is positioned between side wall 272 of overmold 209 and side wall 274 of base 266.

FIG. 21 is a sectional view of an overmolded stator according to another embodiment of the present invention. Stator 390 includes a stator lamination formed of a back-iron 392 and a plurality of teeth 394 and 396. For simplicity, phase windings are not shown in FIG. 21. An overmold 398 is formed around a circumferential side surface 400 of stator 390. As in the previous embodiments, starer 390 can be mounted within the base by compressing overmold 398 against a side wall of the base, by providing a mounting tab or a projection along surface 400, by providing an adhesive along an under surface 402 or by using a damping bridge such as that disclosed in FIG. 2. The overmold can encapsulate the entire stator, can be limited to a particular surface of the stator or can be segmented about a circumference of the stator.

Figure 22:
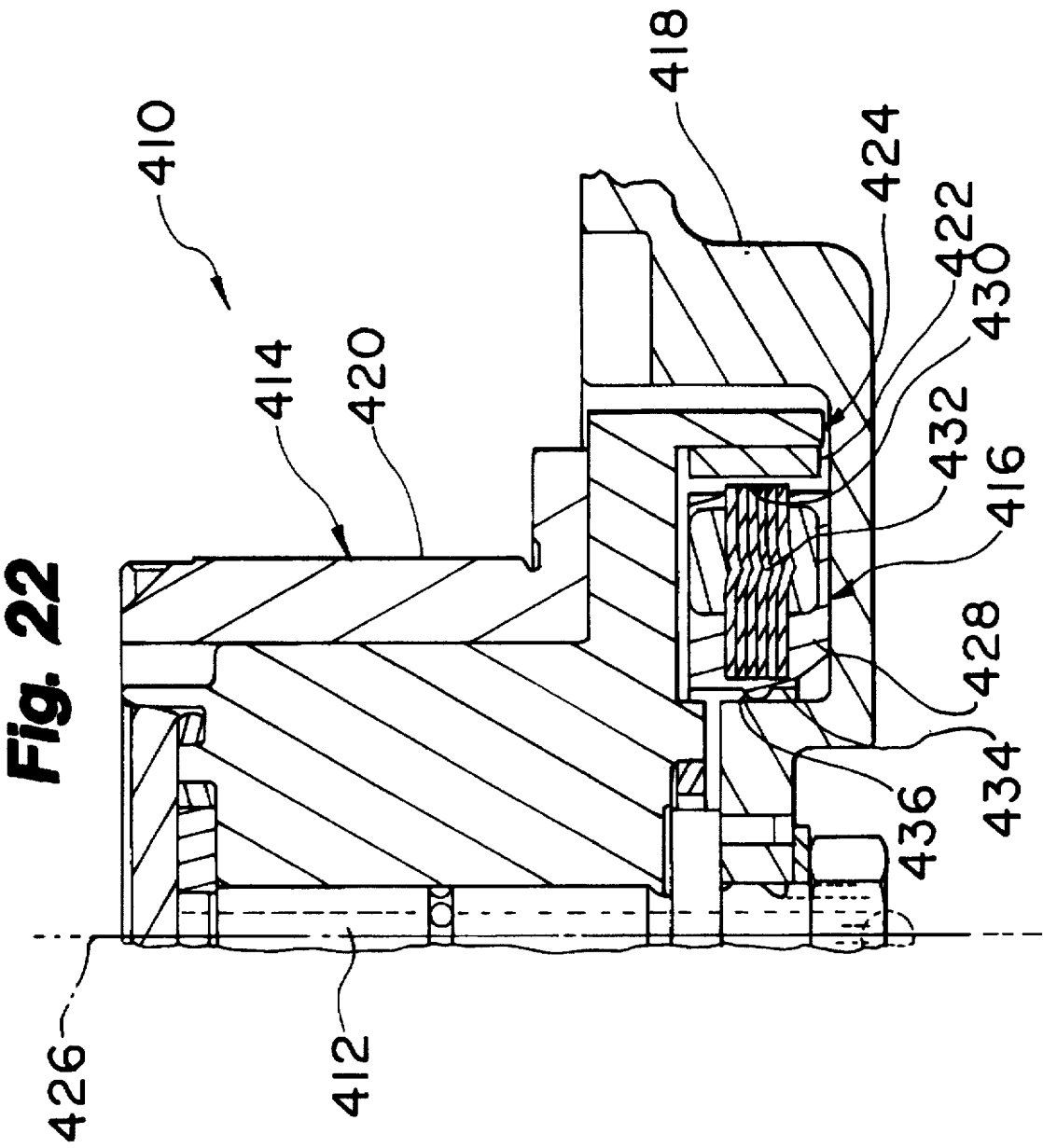
FIG. 22 is a fragmentary sectional view of a spindle motor having an overmolded stator with a radial position that is internal to the rotor.

FIG. 22 is a fragmentary sectional view of a disc drive spindle motor having a stator with a radial position that is internal to the rotor with respect to the central axis. Disc drive spindle motor 410 includes a stationary member 412, a hub or sleeve 414, a stator 416 and a base 418. Hub 414 includes a disc carrier member 420 and a permanent magnet 422 which acts as a rotor for spindle motor 410. Stator 416 has a radial position that is internal no rotor 424 with respect to central axis 426. Stator 416 has an overmold 428 which substantially encapsulates stator 416. An outer diameter surface 430 of stator lamination 432 remains exposed to rotor 424. An inner diameter 434 of overmold 428 is secured to base 418 with any one of the mounting features discussed above. For example, in FIG. 22, inner diameter surface 434 includes a raised annular projection 436 which is compressed against base 418.

Integrating the resilient coupling to the stator by overmolding the stator has several advantages. First, the overmold provides a larger surface area over which sympathetic and other vibrations causing acoustic noise can be damped. The overmold acts as a spring to isolate the stator from the base or other stationary members. The overmold provides a smooth exterior surface which can be cleaned more easily than an exposed stator. With an exposed stator, the stator laminations, teeth and windings form a rough, uneven surface which is difficult to clean during assembly. Any impurities remaining on the stator can migrate To the disc surfaces or heads causing read and write errors and problems in controlling the fly height of the heads. The overmold also provides the stator lamination and the phase windings an effective environment seal. The overmold allows a greater integration of component parts of the stator and the mounting features which results in fewer parts and an easier assembly. The overmold also increases the overall mechanical stiffness of the disc drive assembly which provides greater disc drive integrity.

Although the present invention has been described with reference to preferred embodiments, workers skilled in the art will recognize that changes may be made in form and detail without departing from the spirit and scope of the invention. For example, the resilient coupling between the stator and the base can be implemented in a variety of ways and can include a combination of the embodiments discussed above. The embodiments shown in the figures are provided by way of example only. Also, the resilient coupling can be implemented in a variety of stator and base configurations. The stator isolation of the present invention can be used in fixed shaft or rotating shaft spindle motors. In a rotating shaft spindle motor, the bearing is located between the rotating shaft and an outer stationary sleeve which is coaxial with the rotating shaft. The term "base" used herein refers to the base itself or any stationary extension thereof.

What is claimed is:

1. A disc drive spindle motor for rotating at least one disc about a central axis in a storage device, comprising:

a base;

a stationary member attached to the base;

a hub comprising a rotor and a disc carrying member, wherein the hub is rotatable about the central axis with respect to the stationary member;

a bearing interconnecting the hub with the stationary member;

a stator coaxial with the rotor;

a resilient, acoustic vibration damping overmold which encapsulates at least a portion of the stator; and wherein the stator is attached to the base through the resilient, vibration damping overmold such that the overmold inhibits transfer of vibrations between the stator and the base.

2. The disc drive spindle motor of claim 1 wherein the stator has a circumferential surface facing the rotor and wherein the overmold completely encapsulates the stator, including the circumferential surface.

3. The disc drive spindle motor of claim 1 wherein the stator has a circumferential surface facing the rotor and wherein the overmold substantially encapsulates the stator leaving at least a portion of the circumferential surface exposed to the rotor.

4. The disc drive spindle motor of claim 1 wherein the resilient overmold forms a smooth external surface about the stator which is substantially free of cavities.

5. The disc drive spindle motor of claim 1 wherein:

the stator has a circumferential surface facing the rotor, a plurality of phase windings disposed about the circumferential surface and gaps between the phase windings; and the overmold substantially fills the gaps.

6. The disc drive spindle motor of claim 5 and further comprising:

at least one mounting aperture extending through the overmold in at least one of the gaps in an axial direction with respect to the central axis; and a mounting pin extending through the mounting aperture and having a distal end attached to the base.

7. The disc drive spindle motor of claim 6 wherein the mounting pin comprises a plastic material which is heat-staked to the base.

8. The disc drive spindle motor of claim 1 wherein the stator has a circumferential surface opposite the rotor; and the overmold comprises at least one mounting ear extending from the circumferential surface in a radial direction away from the rotor and secured to the base.

9. The disc drive spindle motor of claim 8 wherein the mounting ear comprises a rigid material encapsulated by the overmold.

10. The disc drive spindle motor of claim 1 wherein:

the stator has a circumferential surface opposite the rotor; and the disc drive spindle motor further comprises a rigid mounting ring extending partially around the circumferential surface, the mounting ring having at least one mounting ear which extends in a radial direction away from the rotor and is secured to the base and having a proximal edge which is adjacent to the circumferential surface and encapsulated by the overmold.

11. The disc drive spindle motor of claim 1 and further comprising:

a film having upper and lower surfaces carrying a pressure sensitive adhesive, wherein the lower surface is adhered to the base; and wherein the overmold has a lower surface which is adhered to the upper surface of the film.

12. The disc drive spindle motor of claim 1 wherein the overmold has a circumferential surface opposite to the rotor, the circumferential surface having a projection which is compressed between the stator and the base.

13. The disc drive spindle motor of claim 12 wherein the projection comprises a first annular projection extending along the circumferential surface.

14. The disc drive spindle motor of claim 13 wherein the projection further comprises a second annular projection extending along the circumferential surface and spaced from the first annular projection.

15. The disc drive spindle motor of claim 1 wherein the bearing comprises a hydrodynamic bearing.

16. The disc drive spindle motor of claim 1 wherein the bearing comprises a ball bearing.

17. The disc drive spindle motor of claim 1 wherein the stator has an axial position that is below the hub with respect to the central axis.

18. The disc drive spindle motor of claim 1 wherein the stator has a radial position that is internal to the rotor with respect to the central axis.

19. The disc drive spindle motor of claim 1 wherein the stator has a radial position that is external to the rotor with respect to the central axis.

20. The disc drive spindle motor of claim 1 wherein the overmold has a lower surface which faces the base in an axial direction with respect to the central axis and which is adhered to the base.

21. The disc drive spindle motor of claim 1 wherein overmold comprises a rubber material.

22. The disc drive spindle motor of claim 1 wherein the overmold has a vibration damping ratio of at least 2 decibels in an acoustic frequency of 100 Hz to 10 KHz.

23. The disc drive spindle motor of claim 1 wherein the overmold has a vibration damping ratio of at least 5 in an acoustic frequency of 100 Hz to 10 KHz.

24. A disc drive data storage system, comprising:

a housing having a base;

a central axis;

a stationary member attached to the base and coaxial with the central axis;

a rotatable member which is rotatable with respect to the stationary member;

a bearing interconnecting the rotatable member with the stationary member;

at least one data storage disc attached to and coaxial with the rotatable member;

a stator; and a resilient, acoustic vibration damping material overmolded around at least a portion of the stator and wherein the stator is attached to the base through the overmold such that the overmold inhibits transfer of vibrations between the stator and the base.

25. The disc drive data storage system of claim 21 wherein the acoustic vibration damping material encapsulates the stator.

26. The disc drive data storage system of claim 21 wherein the stator has a circumferential side wall facing the base and wherein the acoustic vibration damping material is overmolded around the circumferential side wall.

27. The disc drive data storage system of claim 24 wherein the acoustic vibration damping material has a lower surface which faces the base in an axial direction with respect to the central axis and which is adhered to the base.

28. The disc drive data storage system of claim 24 wherein the damping material comprises a rubber material.

29. The disc drive data storage system of claim 24 wherein the damping material has a vibration damping ratio of at least 2 decibels in an acoustic frequency of 100 Hz to 10 KHz.

30. The disc drive data storage system of claim 24 wherein the damping material has a vibration damping ratio of at least 5 in an acoustic frequency of 100 Hz to 10 KHz.

31. A disc drive spindle motor for rotating at least one disc about a central axis in a storage device, comprising:

a base;

a stationary member attached to the base;

a hub comprising a rotor and a disc carrying member, wherein the hub is rotatable about the central axis with respect to the stationary member;

a bearing interconnecting the hub with the stationary member;

a stator coaxial with the rotor;

an acoustic vibration damping overmold which encapsulates at least a portion of the stator;

a film having upper and lower surfaces carrying a pressure sensitive adhesive, wherein the lower surface is adhered to the base; and wherein the overmold has a lower surface which is adhered to the upper surface of the film.

* * * * *